(12) United States Patent
Vajravel

(10) Patent No.: US 10,223,178 B2
(45) Date of Patent: Mar. 5, 2019

(54) ENABLING WPD DEVICES TO BE MANAGED AT THE CAPABILITY LEVEL

(71) Applicant: Wyse Technology L.L.C., Santa Clara, CA (US)

(72) Inventor: Gokul Thiruchengode Vajravel, Bangalore (IN)

(73) Assignee: WYSE TECHNOLOGY L.L.C., Santa Clara, CA (US)

( * ) Notice: Subject to any disclaimer, the term of this patent is extended or adjusted under 35 U.S.C. 154(b) by 27 days.

(21) Appl. No.: 15/413,068

(22) Filed: Jan. 23, 2017

(65) Prior Publication Data

US 2018/0210770 A1   Jul. 26, 2018

(51) Int. Cl.
*G06F 9/54* (2006.01)
*G06F 9/451* (2018.01)
*G06F 9/4401* (2018.01)

(52) U.S. Cl.
CPC ............ *G06F 9/545* (2013.01); *G06F 9/4411* (2013.01); *G06F 9/452* (2018.02)

(58) Field of Classification Search
CPC ......... G06F 9/545; G06F 9/452; G06F 9/4411
See application file for complete search history.

(56) References Cited

U.S. PATENT DOCUMENTS

| | | | | |
|---|---|---|---|---|
| 2006/0143716 A1* | 6/2006 | Ikemoto | ................. | G06F 21/57 726/27 |
| 2007/0046562 A1* | 3/2007 | Polivy | ..................... | G06F 8/20 345/1.2 |
| 2007/0061477 A1* | 3/2007 | Stoyanov | .............. | G06F 9/4411 709/230 |
| 2009/0083765 A1* | 3/2009 | Davis | .................... | G06F 9/5055 719/321 |
| 2012/0142271 A1* | 6/2012 | Zhodzishsky | ......... | H04L 67/303 455/41.2 |
| 2013/0238768 A1* | 9/2013 | Vaidya | .................... | H04L 67/14 709/220 |
| 2014/0019651 A1* | 1/2014 | Ben-Harosh | .......... | G06F 9/4413 710/63 |
| 2015/0040181 A1* | 2/2015 | Cook | .................. | G06F 21/6281 726/1 |
| 2016/0036818 A1* | 2/2016 | Patesaria | ............... | H04L 63/102 726/3 |

* cited by examiner

*Primary Examiner* — Charles E Anya

(74) *Attorney, Agent, or Firm* — Kirton McConkie; Brian Tucker

(57) ABSTRACT

WPD devices can be managed at the device capability level. When a WPD device is connected to a computer, a filter driver can be employed to examine communications with the WPD device. During initialization, the WPD device will provide a list of its capabilities. The filter driver can intercept this list and compare it against any applicable policies to determine whether any capabilities should be blocked. When it is determined that a capability should be blocked, the filter driver can remove the capability from the list while retaining any non-blocked capabilities. The filter driver can also cause device initialization to fail in some scenarios. In this way, an administrator can block specific capabilities of a WPD device rather than blocking the entire device.

20 Claims, 16 Drawing Sheets

ENABLING WPD DEVICES TO BE MANAGED AT THE CAPABILITY LEVEL

CROSS-REFERENCE TO RELATED APPLICATIONS

N/A

BACKGROUND

The present invention is generally directed to the Windows Portable Devices (WPD) architecture. In particular, the present invention provides a mechanism to classify and manage WPD devices based on the device's capabilities. This mechanism can be employed when the device is locally connected or redirected in a virtual desktop infrastructure (VDI) environment.

The WPD specification is a superset of the Media Transfer Protocol (MTP). WPD enables computers to communicate with attached media and storage devices. As a primary example, when a smart phone is connected to a Windows computer, applications on the computer can use WPD to communicate with the smart phone for the purpose of accessing the different functionalities provided by the smart phone (e.g., storage, SMS, contacts, etc.).

FIG. 1 provides an overview of the WPD architecture on a computer 100. The WPD architecture can generally be divided into three processes: application 101, WPD host process 110, and I/O stack (or kernel mode driver(s)) 120. Application 101 employs the WPD API 102 to communicate with the appropriate WPD driver 111. This communication is carried out via serializers 102a/102b (e.g., to pack or unpack parameters to or from Windows Driver Foundation (WDF) User Mode Driver Framework (UMDF) buffers). WPD driver 111 employs I/O to process WPD messages it receives from WPD API 102. In essence, WPD driver 111 functions as a middleman between application 101 and I/O stack 120. I/O stack 120 will vary depending on the transport required by WPD device 150. For example, WPD device 150 could be connected to computer 100 via IP, Bluetooth, or USB and could employ the MTP, PTP, or MSC protocols.

The primary benefit of WPD is that it provides a common representation of WPD devices even though these devices may vary drastically. This common representation is structured as a hierarchy of objects. At the top of the hierarchy is the device object which represents the device itself. The next level of the hierarchy includes functional objects which each represent a function or capability provided by the device. For example, the object hierarchy of a standard smart phone may include a storage object, a contacts service object, and an SMS service object. Below these functional objects, there may be a number of content objects such as media object under the storage object, contact objects under the contacts service object, and messages under the SMS service object. WPD API 102 provides a number of functions for identifying which objects (or functions and/or content) a WPD device provides and which properties these objects have, as well as for accessing these objects. Again, WPD API 102 provides a common interface through which this can be accomplished.

Because the present invention can be implemented in cases where a WPD device is connected to a computer via device redirection, an overview of how device redirection can be accomplished will be provided. Device redirection generally refers to making a device that is connected to a client accessible within a virtual desktop as if the device had been physically connected to the virtual desktop. In other words, when device redirection is implemented, a user can connect a device to his or her client terminal and the device will function as if it had been connected to the server.

FIGS. 2 and 3 and the following description will provide a general overview of how USB device redirection can be implemented in accordance with some embodiments of the present invention. In FIG. 2, a computing system 200 is depicted as including a number of client terminals 202a-202n (referenced generally herein as client(s) 202) in communication with a server 204 via a network 206. Server 204 can be configured to support a remote session (e.g., a remote desktop session) wherein a user at a client 202 can remotely access applications and data at the server 204 from the client 202. Such a connection may be established using any of several well-known techniques such as the Remote Desktop Protocol (RDP) and the Citrix® Independent Computing Architecture (ICA).

Client terminal 202 may represent a computer, a mobile phone (e.g., smart phone), a laptop computer, a thin client terminal, a personal digital assistant (PDA), a portable computing terminal, or a suitable terminal or device with a processor. Server 204 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client 202 may initiate a remote session with server 204 by sending a request for remote access and credentials (e.g., login name and password) to server 204. If server 204 accepts the credentials from client 202, then server 204 may establish a remote session, which allows a user at client 202 to access applications and data at server 204. During the remote session, server 204 sends display data to client 202 over network 206, which may include display data of a desktop and/or one or more applications running on server 204. The desktop may include, for example, icons corresponding to different applications that can be launched on server 204. The display data allows client 202 to locally display the desktop and/or applications running on server 204.

During the remote session, client 202 may send user commands (e.g., inputted via a mouse or keyboard at client 202) to server 204 over network 206. Server 204 may process the user commands from client 202 similar to user commands received from an input device that is local to server 204. For example, if the user commands include mouse movements, then server 204 may move a pointer on the desktop running on server 204 accordingly. When the display data of the desktop and/or application changes in response to the user commands, server 204 sends the updated display data to client 202. Client 202 locally displays the updated display data so that the user at client 202 can view changes at server 204 in response to the user commands. Together, these aspects allow the user at client 202 to locally view and input commands to the desktop and/or application that is running remotely on server 204. From the perspective of the client side, the desktop running on server 204 may represent a virtual desktop environment.

FIG. 3 is a block diagram of a local device virtualization system 300 in accordance with embodiments of the present invention. System 300 may include client 202 in communication with server 204 over network 206 as illustrated in FIG. 2. Client 202 may include a proxy 210, a stub driver 220, and a bus driver 230. Client 202 can be connected to a device 240, as shown in FIG. 3. Server 204 may include an agent 250 and a virtual bus driver 260.

In accordance with USB device redirection techniques, while device 240 is not locally or physically connected to server 204 and is remote to server 204, device 240 appears to server 204 as if it is locally connected to server 204, as discussed further below. Thus, device 240 appears to server 204 as a virtual device 290.

By way of illustration and not limitation, device 240 may be any type of USB device including a machine-readable storage medium (e.g., flash storage device), a printer, a scanner, a camera, a facsimile machine, a phone, an audio device (e.g., a headset), a video device (e.g., a camera), a peripheral device, or other suitable device that can be connected to client 202. Device 240 may be an external device (i.e., external to client 202) or an internal device (i.e., internal to client 202). However, for purposes of the present invention, it can be assumed that device 240 is a WPD device.

Bus driver 230 can be configured to allow the operating system and programs of client 202 to interact with device 240. In one aspect, when device 240 is connected to client 202 (e.g., plugged into a port of client 202), bus driver 230 may detect the presence of device 240 and read information regarding device 240 ("device information") from device 240. The device information may include features, characteristics and other information specific to device 240 such as a device descriptor (e.g., product ID, vendor ID and/or other information), a configuration descriptor, an interface descriptor, an endpoint descriptor and/or a string descriptor. Bus driver 230 may communicate with device 240 through a computer bus or other wired or wireless communications interface.

In accordance with USB device redirection techniques, device 240 may be accessed from server 204 as if the device were connected locally to server 240. Device 240 may be accessed from server 204 when client 202 is connected to server 204 through a user session running on server 204. For example, device 240 may be accessible from the desktop running on server 204 (i.e., virtual desktop environment). To enable this, bus driver 230 may be configured to load stub driver 220 as the default driver for device 240. Stub driver 220 may be configured to report the presence of device 240 to proxy 210 and to provide the device information (e.g., device descriptor) to proxy 210. Proxy 210 may be configured to report the presence of device 240, along with the device information, to agent 250 of server 204 over network 206. Thus, stub driver 220 redirects device 240 to server 204 via proxy 210.

Agent 250 may be configured to receive the report from proxy 210 that device 240 is connected to client 202 and the device information. Agent 250 may further be configured to associate with the report from proxy 210 one or more identifiers for client 202 and/or for a user session through which client 202 is connected to server 204, such as a session number or a session locally unique identifier (LUID). Agent 250 can provide notification of device 240, along with the device information, to virtual bus driver 260. Virtual bus driver 260 (which may be a TCX USB bus driver, or any other bus driver) may be configured to create and store in memory a record corresponding to device 240, the record including at least part of the device information and session identifiers received from agent 250. Virtual bus driver 260 may be configured to report to operating system 170 of server 204 that device 240 is connected and to provide the device information to the operating system. This allows the operating system of server 204 to recognize the presence of device 240 even though device 240 is connected to client 202.

The operating system of server 204 may use the device information to find and load one or more appropriate device drivers for device 240 at server 204. Each driver may have an associated device object (object(s) 281a, 281b, . . . , 281n, referred to generally as device object(s) 281), as illustratively shown in FIG. 3. A device object 281 is a software implementation of a real device 240 or a virtualized (or conceptual) device 290. Different device objects 281 layer over each other to provide the complete functionality. The different device objects 281 are associated with different device drivers (driver(s) 282a, 282b, . . . 282n, referred to generally as device driver(s) 282). In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for device 240. For example, for a USB device, a USB bus driver will create a device object 281a stating that a new device has been plugged in. Next, a plug-and-play (PNP) component of the operating system will search for and load the best driver for device 240, which will create another device object 281b that is layered over the previous device object 281a. The layering of device objects 281 will create device stack 280. In the case where device 240 is a WPD device, device stack 280 can represent I/O stack 120 and operating system 170 can include WPD host process 110.

Device objects 281 may be stored in a memory of the server 204 associated with virtual bus driver 260. In particular, device objects 281 and resulting device stack 280 may be stored in random-access memory of server 204. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headsets, or USB pen drives. A USB pen drive, for example, can create a USB device stack first, over which it can create a storage device stack, where each of the device stacks have two or more device objects.

Once one or more device object(s) 281 are loaded by operating system 170 of server 204, each device object 281 can create a symbolic link (also referred to as a "device interface") to device object 281 and associated device driver 282. The symbolic link is used by applications running on server 204 to access device object 281 and device 240/290. The symbolic link can be created by a call to a function such as IoCreateSymbolicLink( ) including such arguments as a name for the symbolic link, and a name of device object 281 or associated device 240. In one example, for example, a symbolic link to a USB flash drive device 240 is created by a call from a device object 281 for device 240 to the function IoCreateSymbolicLink( ) including arguments "\\GLOBAL??\C:" (i.e., the name for the symbolic link) and "\Device\HarddiskVolume1" (i.e., a name of the device object).

The creation of a symbolic link results in an entry being created in an object manager namespace (OMN) of operating system 170. The OMN stores information on symbolic links created for and used by operating system 170, including symbolic links for devices 240, virtualized devices 290, and applications 270 running on server 204.

As a result of the symbolic link creation process, a symbolic link to device 240 is enumerated in the OMN of server 204. Once the presence of device 240 is reported to operating system 170 of server 204, device 240 may be accessible from a user session (and associated desktop) running on server 204 (i.e., virtual desktop environment). For example, device 240 may appear as an icon on the virtual desktop environment and/or may be accessed by applications running on server 204.

As was described above, in the case that device 240 is a WPD device, application 270 can represent application 101 and will therefore employ WPD API 102 to communicate with WPD device 150. In such a scenario, virtual bus driver 260 will be positioned at the bottom of I/O stack 120 and can perform the redirection techniques described above to cause WPD device 150 to appear as if it were connected locally to server 204.

There may be scenarios where it is desirable to prevent a user from connecting his or her WPD device to a computer. For example, an administrator may desire to prevent a user from being able to use his smartphone as a mass storage device when connected to his work computer (whether via a local session or remote session). Currently, this can be accomplished only by blocking the entire WPD device (e.g., via Active Directory Group Policy). Accordingly, if it were desired to still allow a user to access other (i.e., non-storage) capabilities of the WPD device, there would be no way to do so.

BRIEF SUMMARY

The present invention extends to methods, systems, and computer program products for enabling WPD devices to be managed at the capability level. When a WPD device is connected to a computer, a filter driver can be employed to examine communications with the WPD device. During initialization, the WPD device will provide a list of its capabilities. The filter driver can intercept this list and compare it against any applicable policies to determine whether any capabilities should be blocked. When it is determined that a capability should be blocked, the filter driver can remove the capability from the list while retaining any non-blocked capabilities. The filter driver can also cause device initialization to fail in some situations. In this way, an administrator can block specific capabilities of a WPD device rather than blocking the entire device.

In one embodiment, the present invention is implemented by a filter driver as a method for enabling a WPD device to be managed at the capability level. The filter driver, which is loaded in a device stack for the WPD device, receives a list pertaining to the WPD device. The filter driver accesses an applicable policy and determines that the applicable policy indicates that a first capability should be blocked. The filter driver also determines that a first item in the list pertains to the first capability. In response, the filter driver removes the first item from the list and passes the list with the first item removed to a higher level driver.

In another embodiment, the present invention is implemented as computer storage media storing computer executable instructions which when executed by one or more processors implement a method for managing a WPD device. The method includes: intercepting, at a filter driver, a response to a request to list capabilities of a WPD device; comparing each capability in the response to an applicable policy; for each capability that the applicable policy indicates should be blocked, removing the capability from the response; and passing the response to a higher level driver.

In another embodiment, the present invention is implemented as a method for enabling a redirected WPD device to be managed at the capability level. In response to the WPD device being connected to a client terminal that has established a remote session on a server, a filter driver is caused to be loaded on a device stack on the server for the WPD device. The filter driver intercepts a list of capabilities of the WPD device and modifies the list by removing one or more capabilities that an applicable policy indicates should be blocked. The filter driver than passes the modified list to a WPD driver.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification, the term "capability" as it pertains to a WPD device should be construed as a function that the device provides. For example, in the current WPD specification, a device's capabilities are defined as "functional objects" which are represented using GUIDs.

Figure 1:
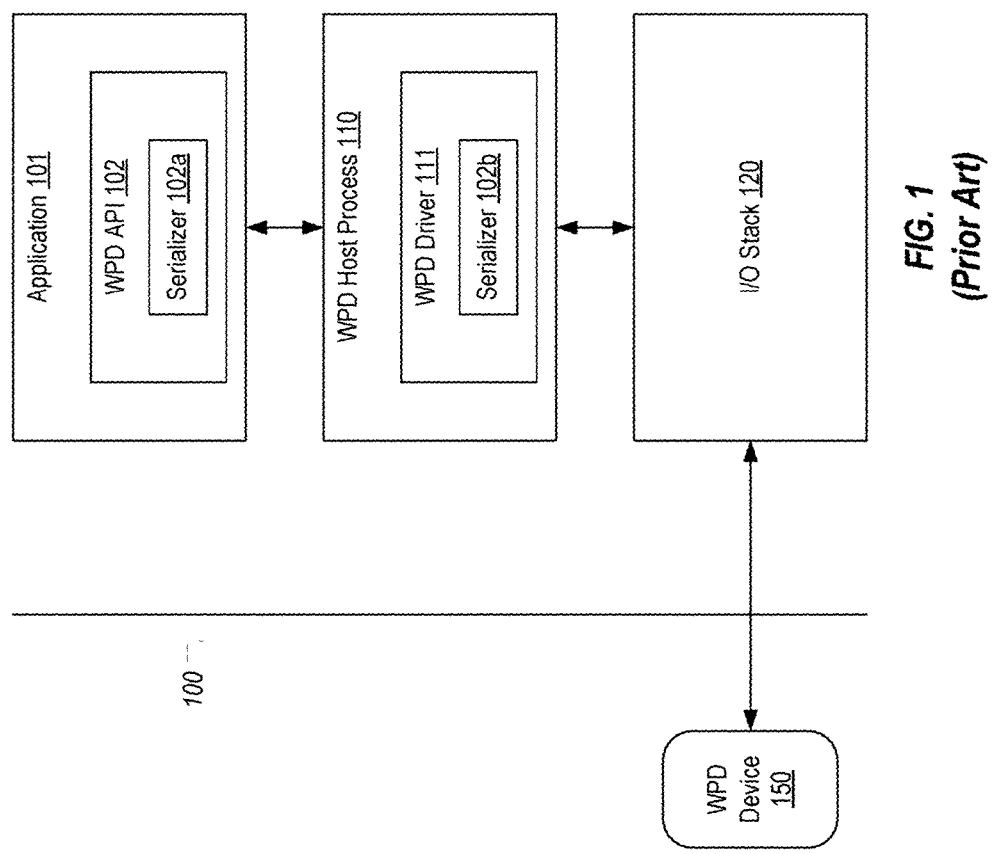
FIG. 1 illustrates an example of the WPD architecture.
Figure 2:
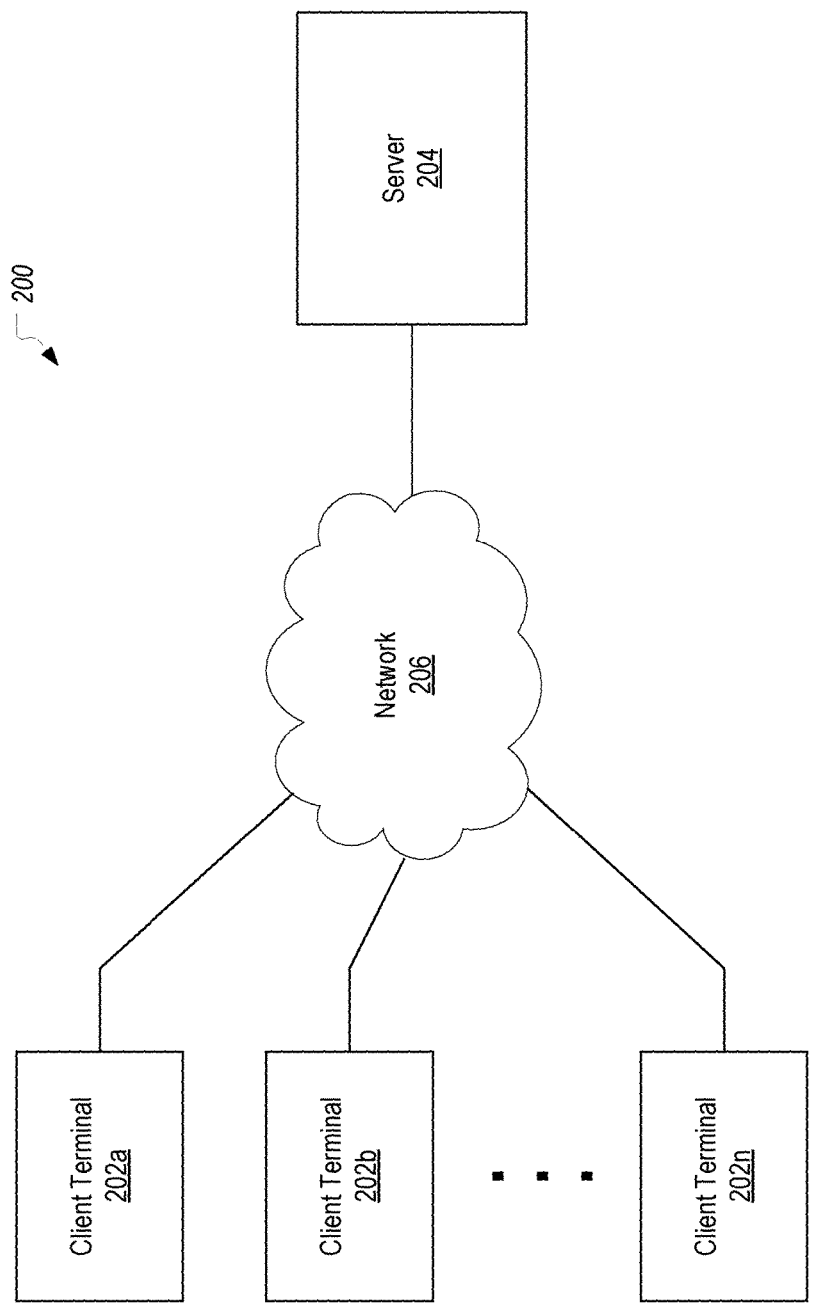
FIG. 2 illustrates an example environment in which a WPD device can be redirected.
Figure 3:
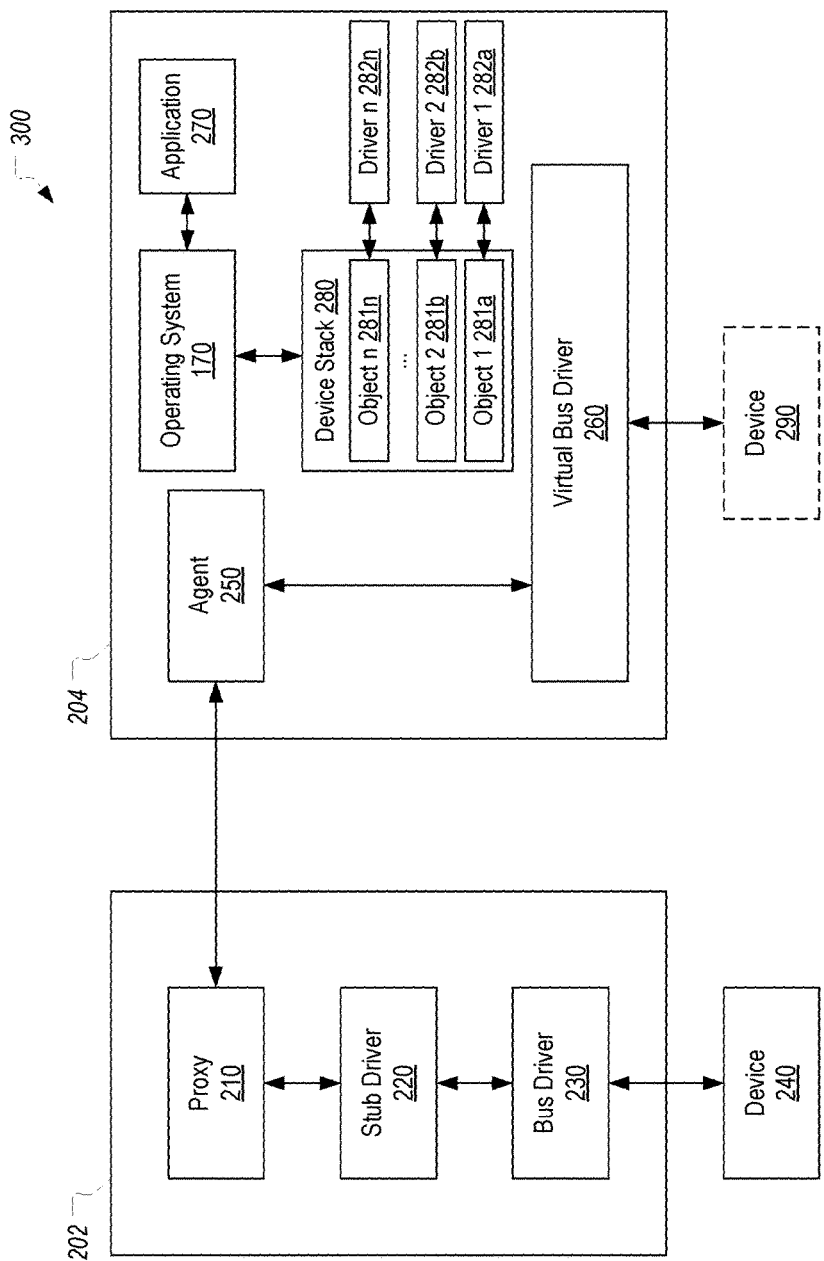
FIG. 3 illustrates an example of how device redirection can be accomplished.
Figure 4:
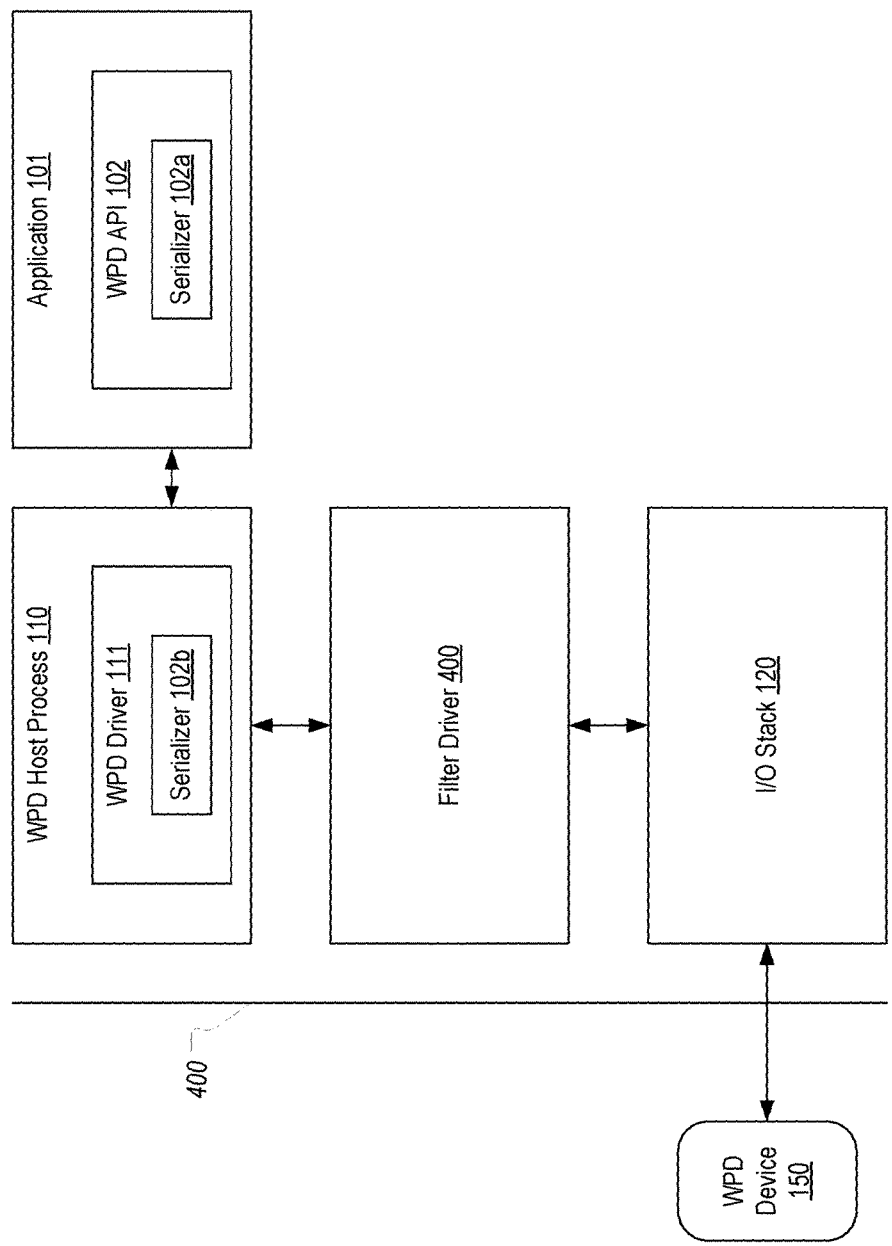
FIG. 4 illustrates a filter driver that can be employed to enable a WPD device to be managed at the capability level in accordance with one or more embodiments of the present invention.

FIG. 4 provides a general illustration of how a filter driver 400 can be employed on a computer 400 within the WPD architecture to allow WPD device 150 to be managed at the capability level. As was described in the background, WPD device 150 could be locally connected to computer 400 or connected to a client terminal 102 and redirected to computer 400. FIG. 4 is the same as FIG. 1 with the addition of filter driver 400 above I/O stack 120. Filter driver 400 can preferably be a kernel mode driver and can be registered to be loaded on top of any WPD class driver. For example, Windows provides a number of WPD class driver solutions such as a class driver solution for PTP over USB, IP, and Bluetooth, a class driver solution for MTP over USB, IP, and Bluetooth, and a class driver solution for MSC over USB. Also, a vendor may define other WPD class driver solutions. Therefore, I/O stack 120 can represent any of the Windows provided class driver or any vendor provided class driver as well as any other lower level drivers.

As shown, filter driver 400 is positioned between WPD driver 111 and I/O stack 120 (i.e., between WPD driver 111 and the WPD class driver for the particular WPD device). Therefore, when WPD driver 111 communicates with I/O stack 120, filter driver 400 can intercept the communications and handle them in accordance with policy. For example, if policy dictates that mass storage devices should be blocked and WPD device 150 provides the mass storage capability, filter driver 400 can block the mass storage capability without affecting other capabilities that WPD device 150 may provide.

FIGS. 5A-5E provide an example of how filter driver 400 can perform this filtering of the capabilities of a WPD device 550. For this example, it will be assumed that WPD device 550 employs MTP over USB and therefore MTP driver 520 has been loaded on computer 400. It is also assumed that filter driver 400 is registered as an upper level filter driver for MTP driver 520 and will therefore intercept communications between WPD driver 111 and MTP driver 520.

Figure 5A:
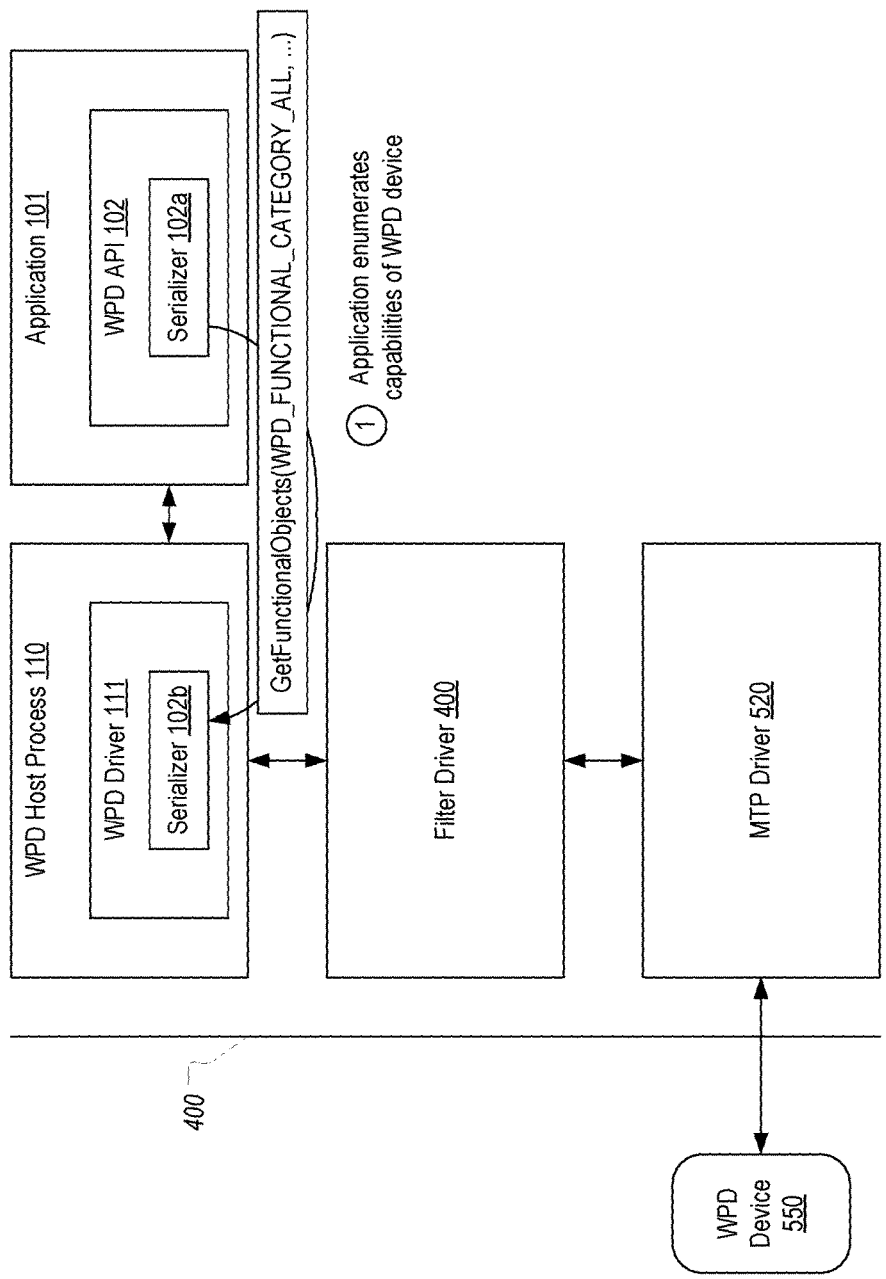
FIGS. 5A-5E illustrate an example of how a filter driver can block specific capabilities of a WPD device.

Initially, when WPD device 550 is connected, application 101 can enumerate the capabilities of WPD device 550 as represented in step 1 in FIG. 5A. For example, application 101 can invoke the GetFunctionalObjects method with an input of WPD_FUNCTIONAL_CATEGORY ALL which specifies that all functional objects of WPD device 550 should be returned.

Figure 5B:
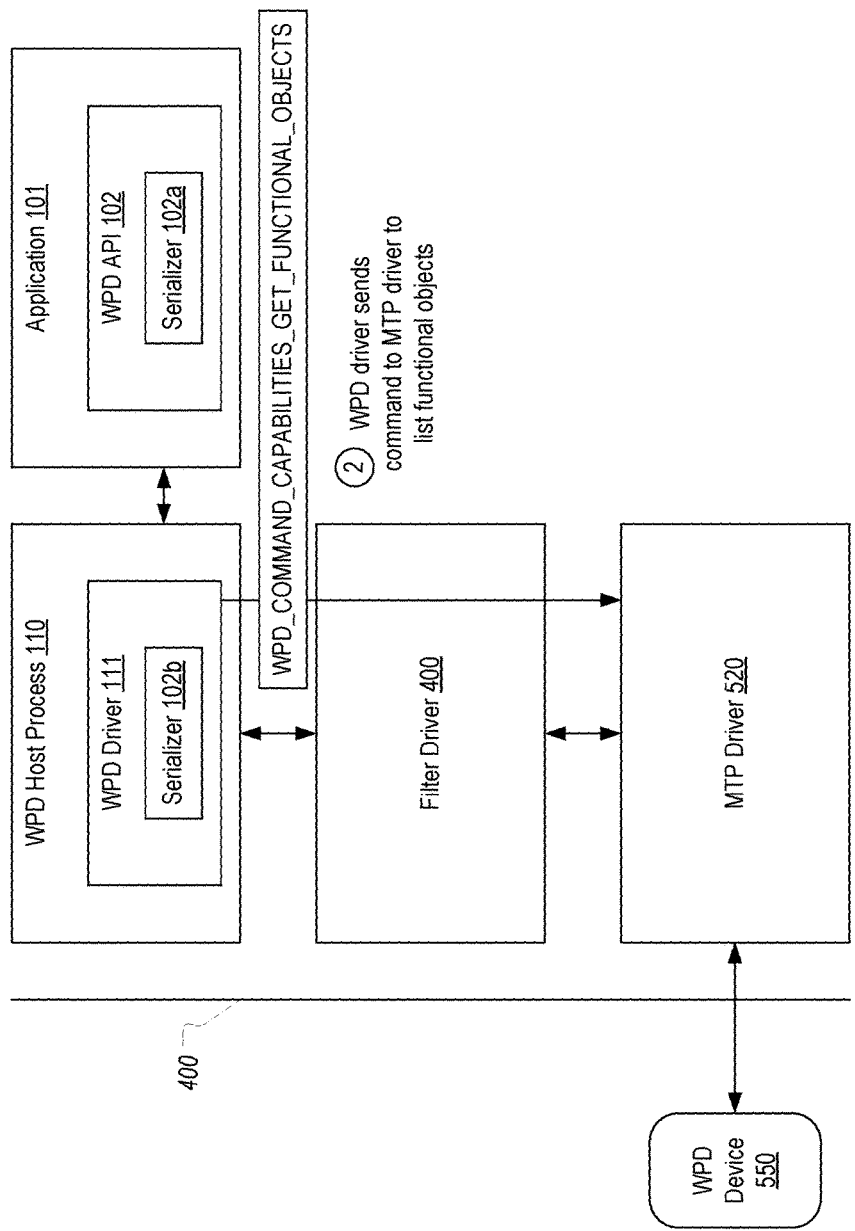

In step 2, as shown in FIG. 5B, WPD driver 111 will respond by sending a command to MTP driver 520 requesting the functional objects (or capabilities) of WPD device 550. For example, WPD driver 111 could send the WPD_COMMAND_CAPABILITIES_GET_FUNCTIONAL_OBJECTS command to MTP driver 520. Filter driver 400 will intercept this command but can allow it to proceed so that MTP driver 520 will enumerate the functional objects of WPD device 550. Although not shown, MTP driver 520 will perform the necessary functionality to create a list of capabilities for WPD device 550. As is known, this list will include the object IDs of the functional objects in the requested category (which is all categories in this example).

Figure 5C:
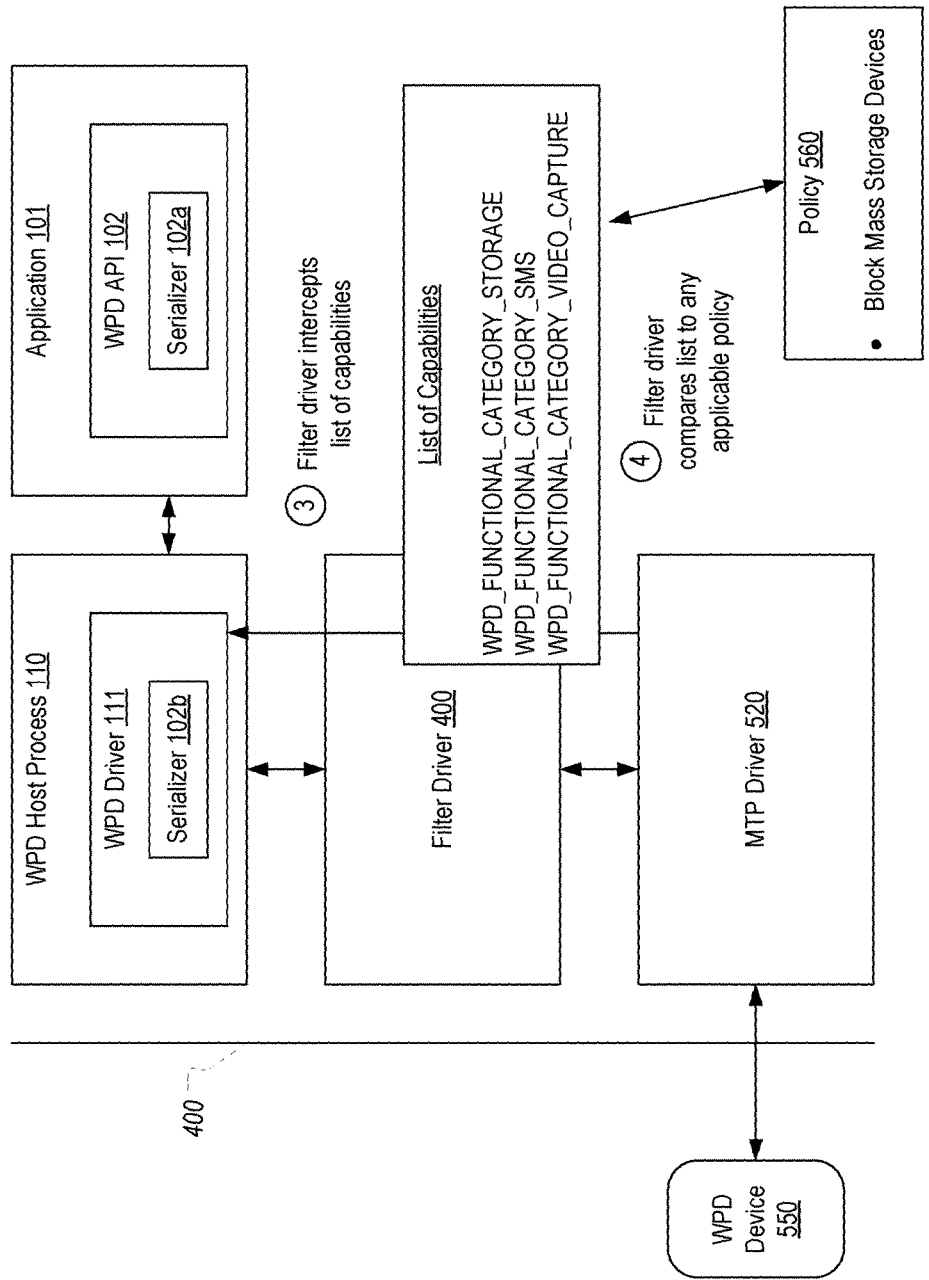

In step 3, when MTP driver 520 returns the list of capabilities (or functional objects) of WPD device 550, filter driver 400 can intercept the response as shown in FIG. 5C. Then, in step 4, filter driver 400 can compare each capability defined in the list to any applicable policy. For example, it can be assumed that a policy 560 is applicable in this scenario (e.g., policy 560 may be a group policy object that applies to a group to which the current user belongs). As shown, policy 560 may define that mass storage devices should be blocked.

Figure 5D:
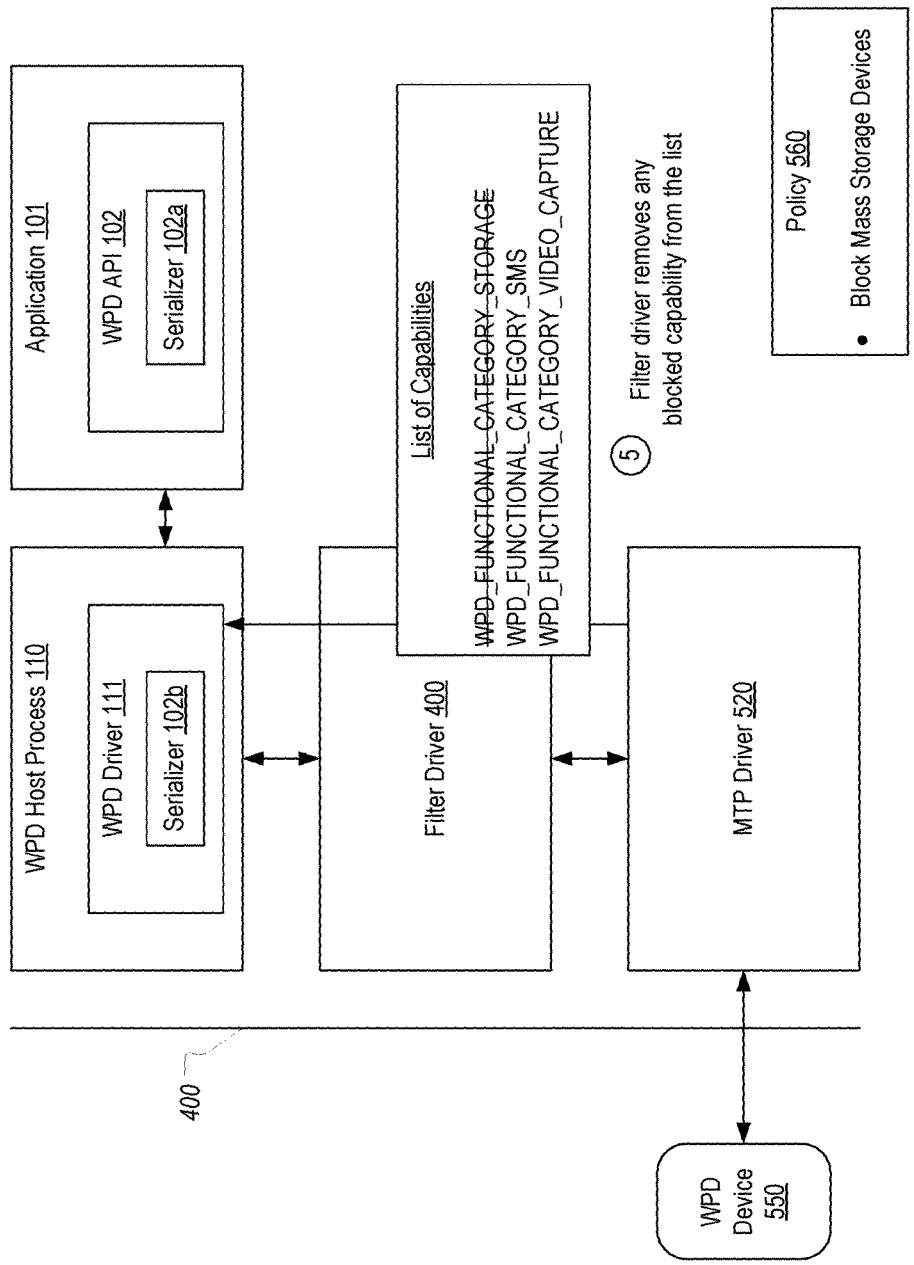
Figure 5E:
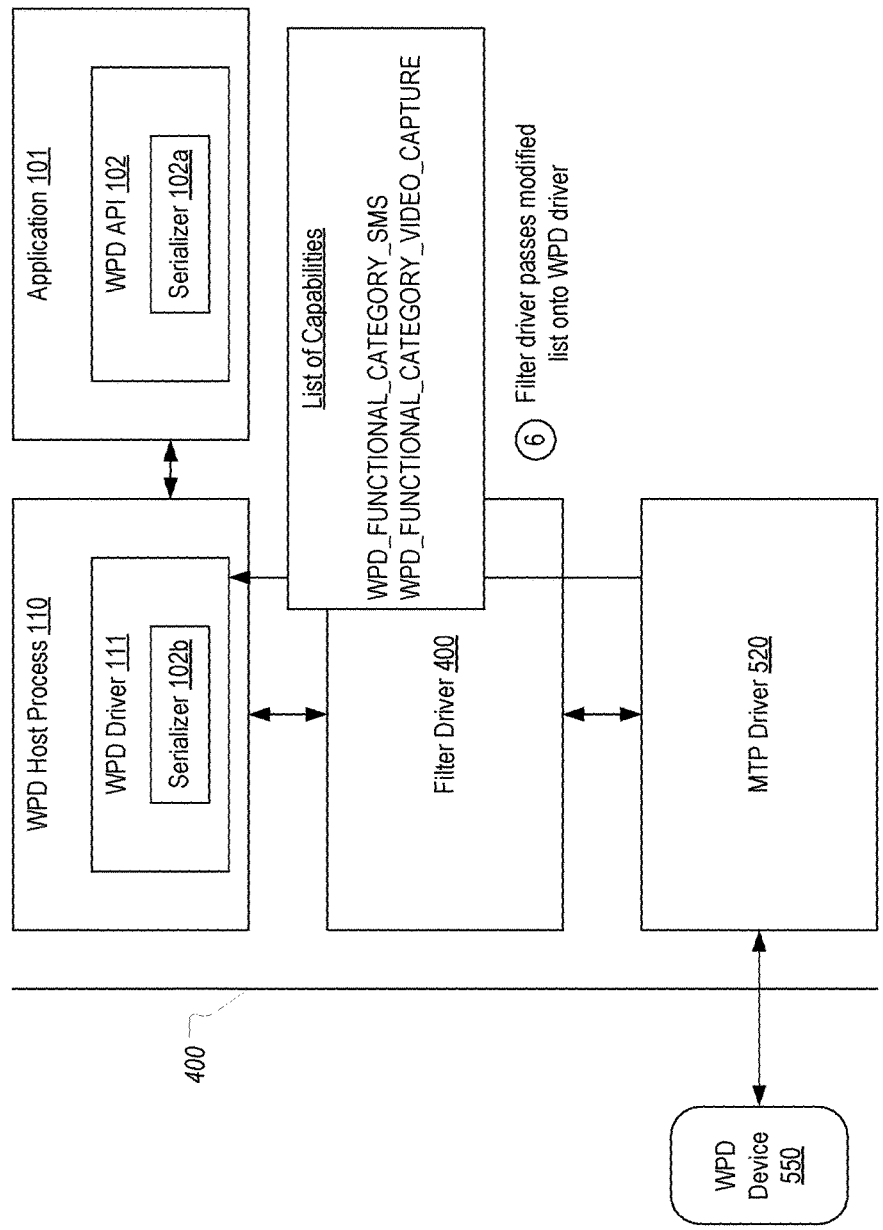

As shown in FIG. 5D as step 5 and based on policy 560, filter driver 400 can modify the list of WPD device 550's capabilities to remove any capability that should be blocked. In this case, policy 560 dictates that mass storage devices should be blocked and therefore, filter driver 400 can delete the WPD_FUNCTIONAL_CATEGORY_STORAGE GUID from the list of capabilities. After modifying the list of capabilities to remove any blocked capabilities, filter driver 400 can then pass the modified list onto WPD driver 111 as represented as step 6 in FIG. 5E.

As a result of this processing, application 101 will receive a list of capabilities for WPD device 550 that only includes the SMS and video capture functional objects. Therefore, from application 101's perspective, WPD device 550 will not have mass storage capabilities.

Similar processing can be performed on other types of requests. For example, if WPD driver 111 issues a request for the commands supported by MTP driver 520 (e.g., using the WPD_COMMAND_CAPABILITIES_GET_SUPPORTED_COMMANDS command), filter driver 400 can intercept the corresponding response and remove any commands pertaining to a blocked device/function. Using the example from above, filter driver 400 could remove the WPD_COMMAND_STORAGE_EJECT and WPD_COMMAND_STORAGE_FORMAT commands from the collection that is returned while leaving any commands pertaining to the SMS and video capture capabilities in the collection. Similarly, if WPD driver 111 issues a request for the options of a command specific to a blocked capability, filter driver 400 can block the corresponding response. For example, if WPD driver 111 issues the WPD_COMMAND_CAPABILITIES_GET_COMMAND_OPTIONS command with WPD_COMMAND_STORAGE_FORMAT as input, filter driver 400 can block the response (e.g., by replacing the actual response—which would include any options for the storage format command—with an error code or an empty response). In short, filter driver 400 can intercept the response to any WPD query/command and modify it appropriately to remove any content particular to a blocked capability thereby hiding the fact that a WPD device provides the blocked capability.

In some embodiments, it may be desirable to prevent a WPD device from being started. For example, if a WPD device only provides blocked capabilities (such as would be the case if policy 560 also blocked SMS and video capture capabilities), it may be preferable to stop the device initialization so that I/O resources will not be wasted on a device that will not be accessible. To accomplish this, filter driver 400 may fail the IRP_MN_START_DEVICE_IRP whenever all of the capabilities of the WPD device are blocked.

FIGS. 6A-6E provide an example of how filter driver 400 may prevent a WPD device 650 from being started when each of its capabilities are blocked. In steps 1 and 2 shown in FIG. 6A, filter driver 400 can intercept the list of capabilities for WPD device 650 and compare the capabilities in the list to any applicable policy in the same manner as described above with reference to FIGS. 5A-5C. In this example, it will be assumed that the storage capability is the only capability of WPD device 650.

Figure 6A:
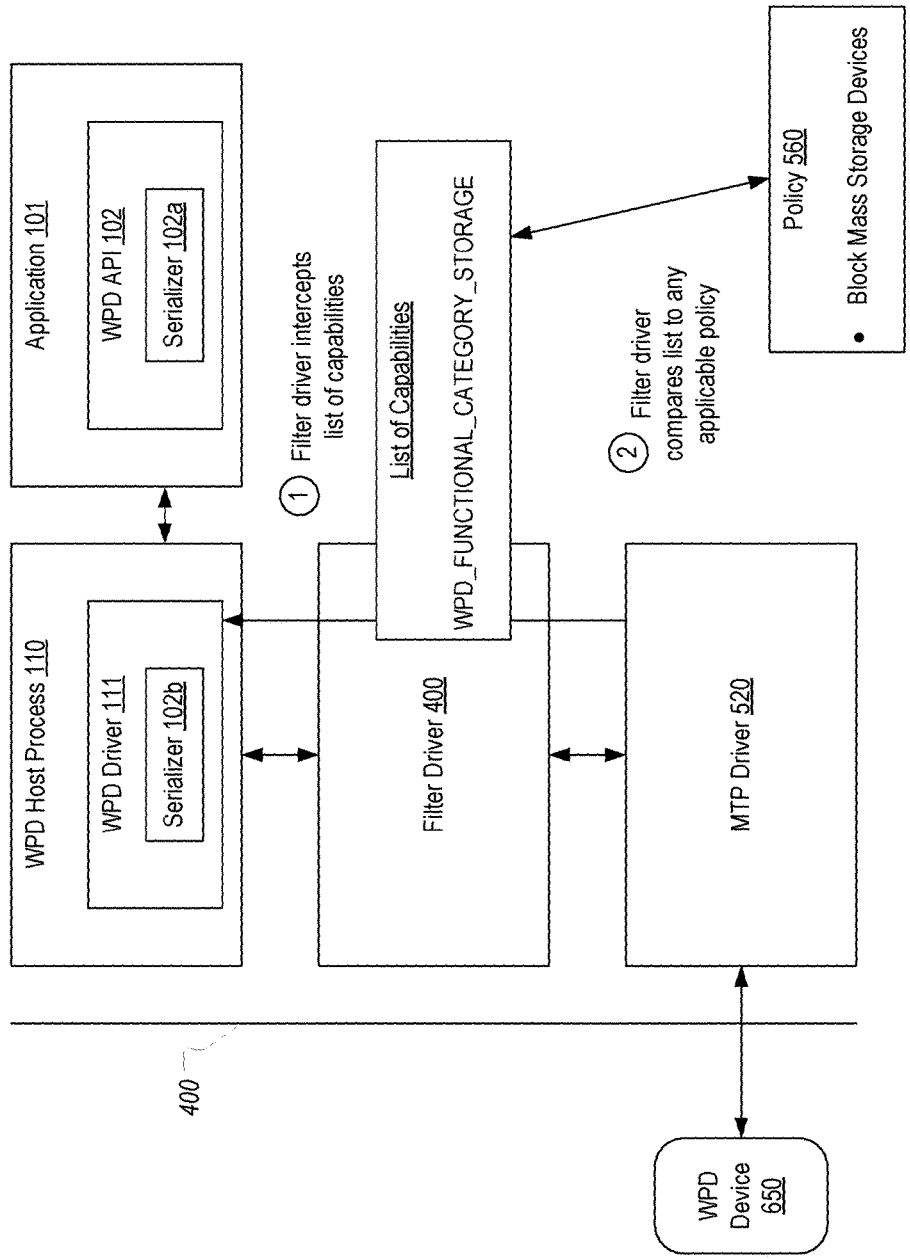
FIGS. 6A-6E illustrate an example of how a filter driver can prevent a WPD device from being started when each of its capabilities are blocked.
Figure 6B:
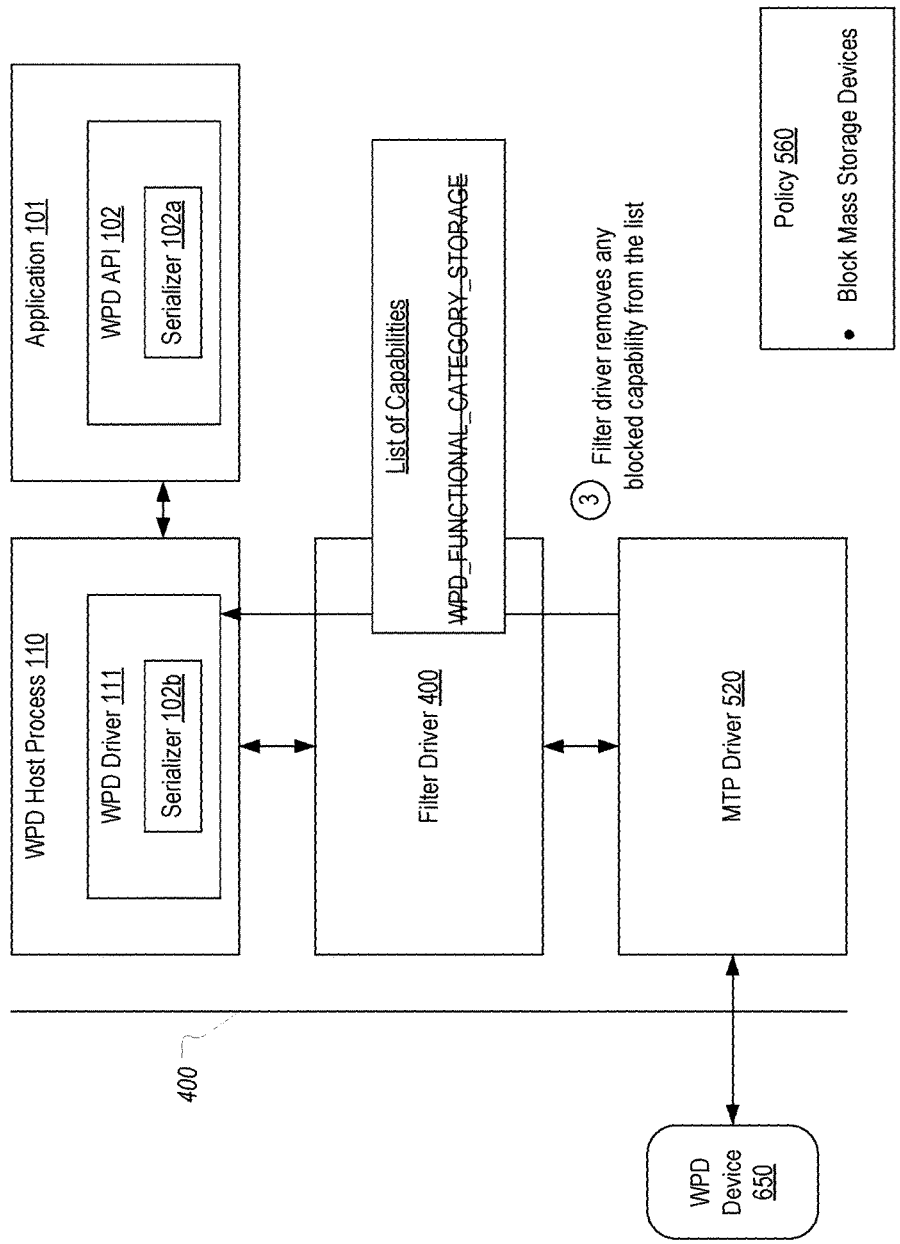
Figure 6C:
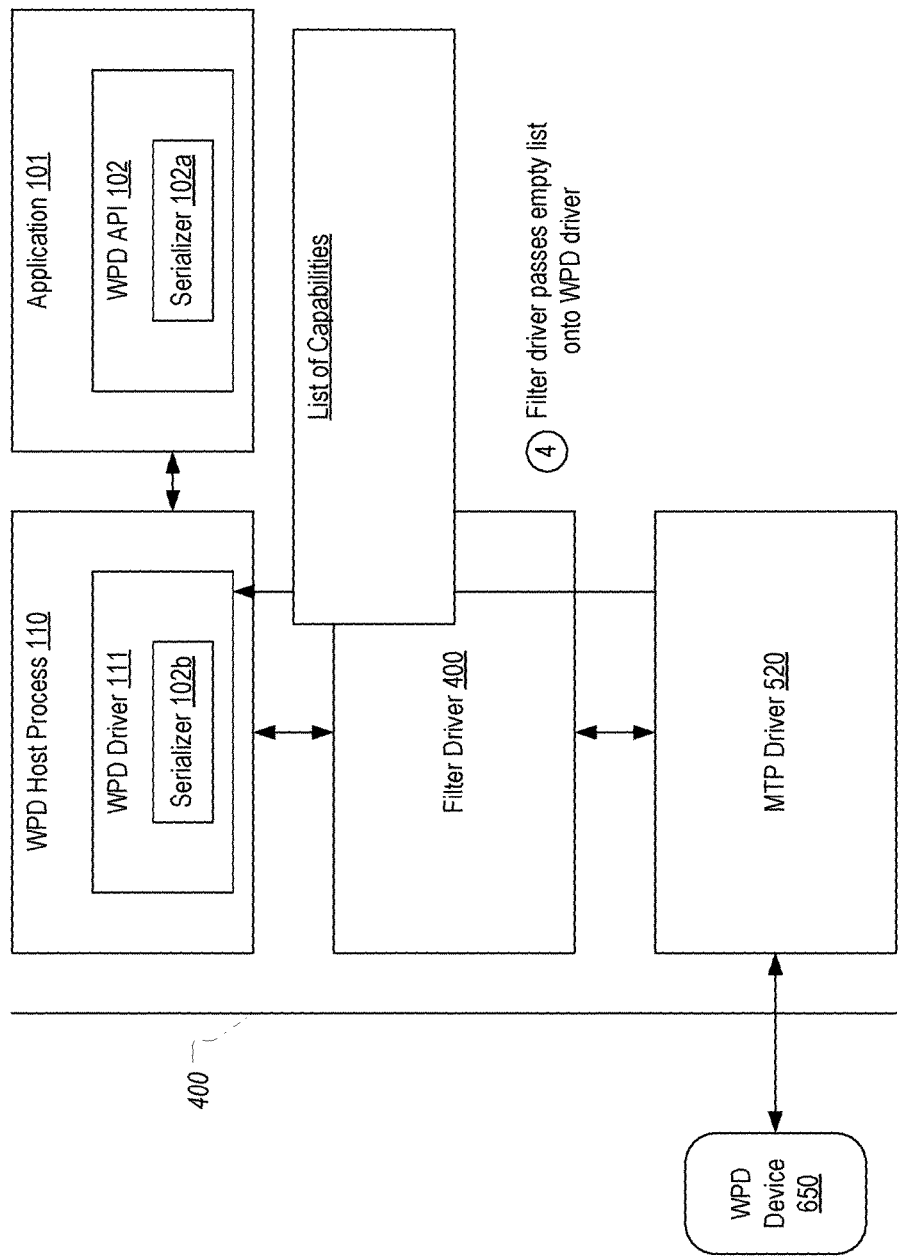
Figure 6D:
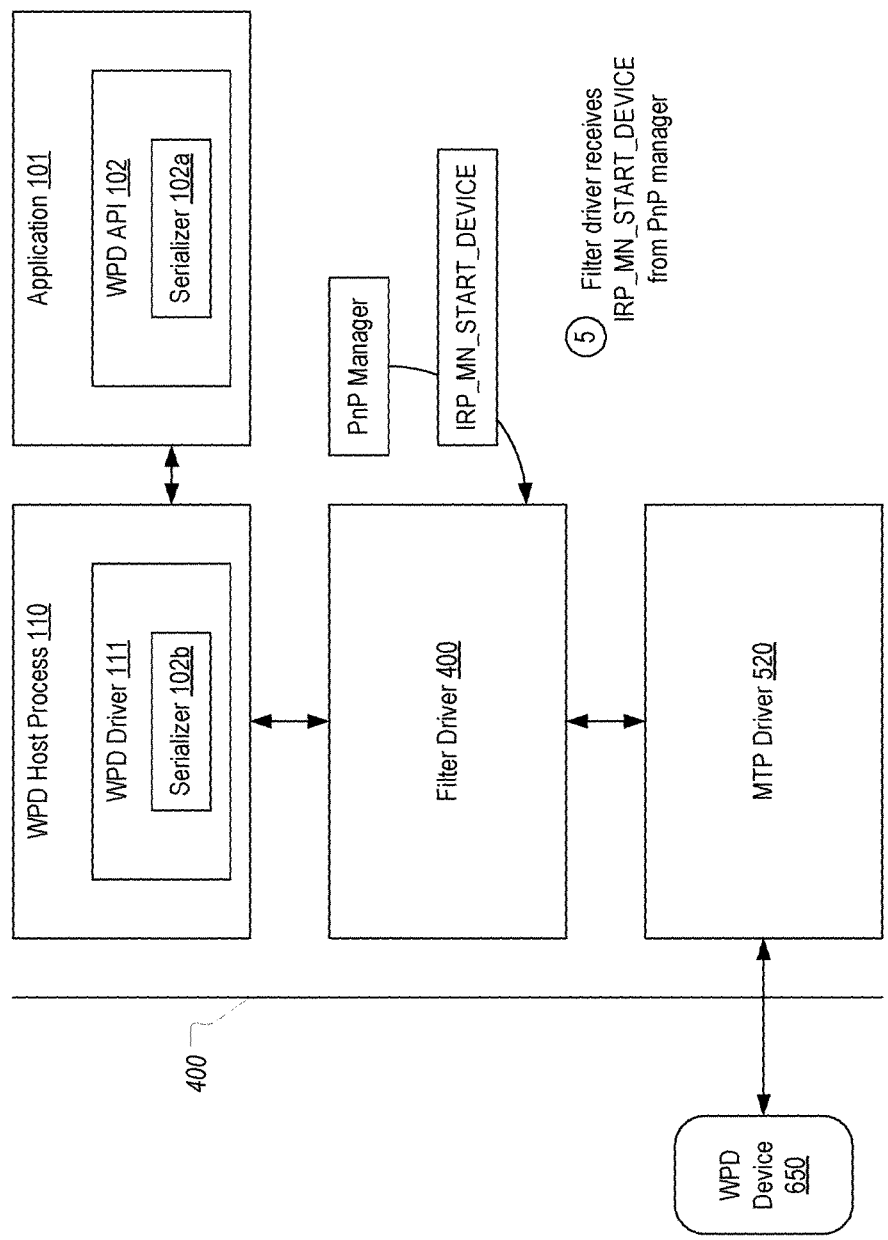
Figure 6E:
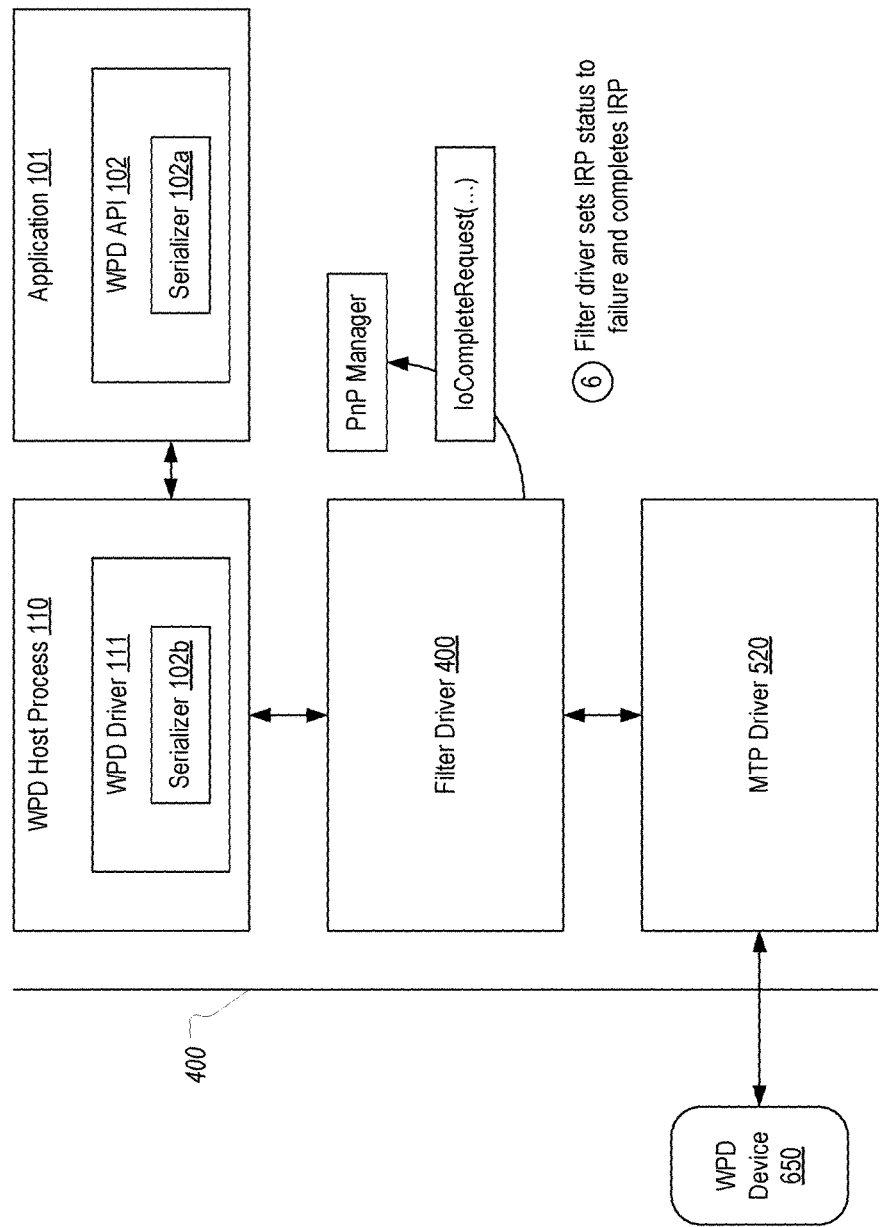

In step 3 shown in FIG. 6B, filter driver 400 can remove the WPD_FUNCTIONAL_CATEGORY_STORAGE entry from the list based on policy 560. As a result, the list of capabilities returned by filter driver 400 will be empty as represented in step 4 in FIG. 6C. In this scenario, filter driver 400 can be configured to stop the initialization of WPD device 650 so that I/O resources will not be wasted. Accordingly, when filter driver 400 receives the IRP_MN_START_DEVICE_IRP in step 5 shown in FIG. 6D, it can cause the IRP to fail as indicated by step 6 in FIG. 6E. For example, filter driver 400 can set the status of the IRP to failure and then call IoCompleteRequest without passing the IRP down to MTP driver 520. By failing this IRP, filter driver 400 will cause the PnP manager to send the IRP_MN_REMOVE_DEVICE_IRP to each driver in the stack which will in turn remove its software representation of WPD device 650.

To summarize, a filter driver can be layered on top of the WPD class driver to allow it to snoop all the WPD IOCTLs and data pertaining to a WPD device. The filter driver can be configured to examine applicable policies and modify the WPD device's I/O in accordance with the applicable policies. In this way, a WPD device can be managed at the individual capability level rather than generally at the device level.

Figure 7:
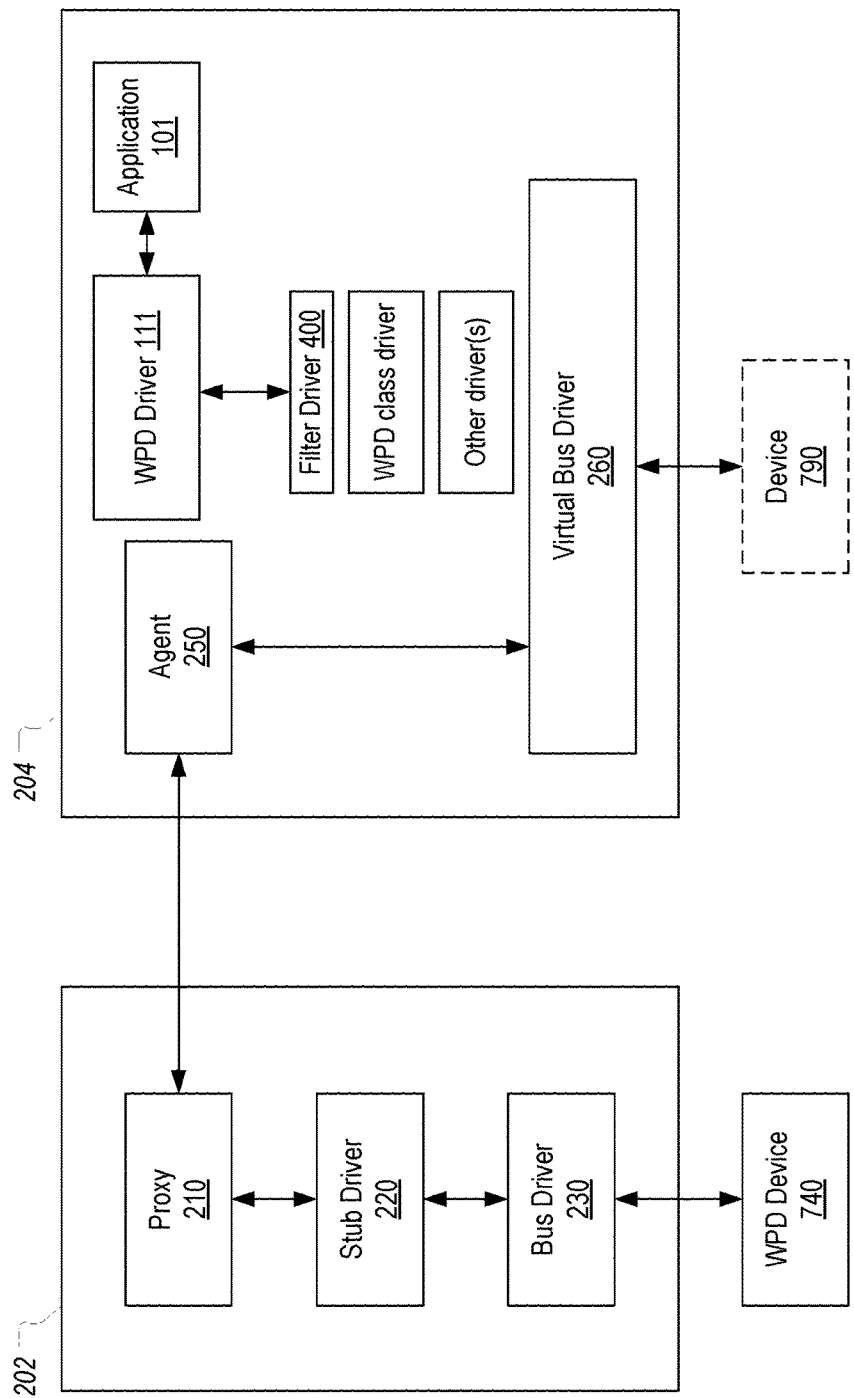
FIG. 7 illustrates an example of how the present invention can be implemented in a device redirection scenario.

As indicated above, the present invention can be implemented in device redirection scenarios. FIG. 7 illustrates an example. As shown, a WPD device 740 is connected to client terminal 202 while client terminal 202 has a remote desktop connection with server 204. In this scenario, virtual bus driver 260 can be employed to cause WPD device 740 to appear as if it were connected directly to server 204 (i.e., as device 790). In this scenario, filter driver 400 can perform the same functionality as described above to manage WPD device 740 at the capability level. Importantly, filter driver 400 can perform this functionality irrespective of the remote display protocol used between client terminal 202 and server 204 and independently of the components on client terminal 202. In other words, the present invention provides a server-side-only mechanism to enable management of redirected WPD devices at the capability level.

Figure 8:
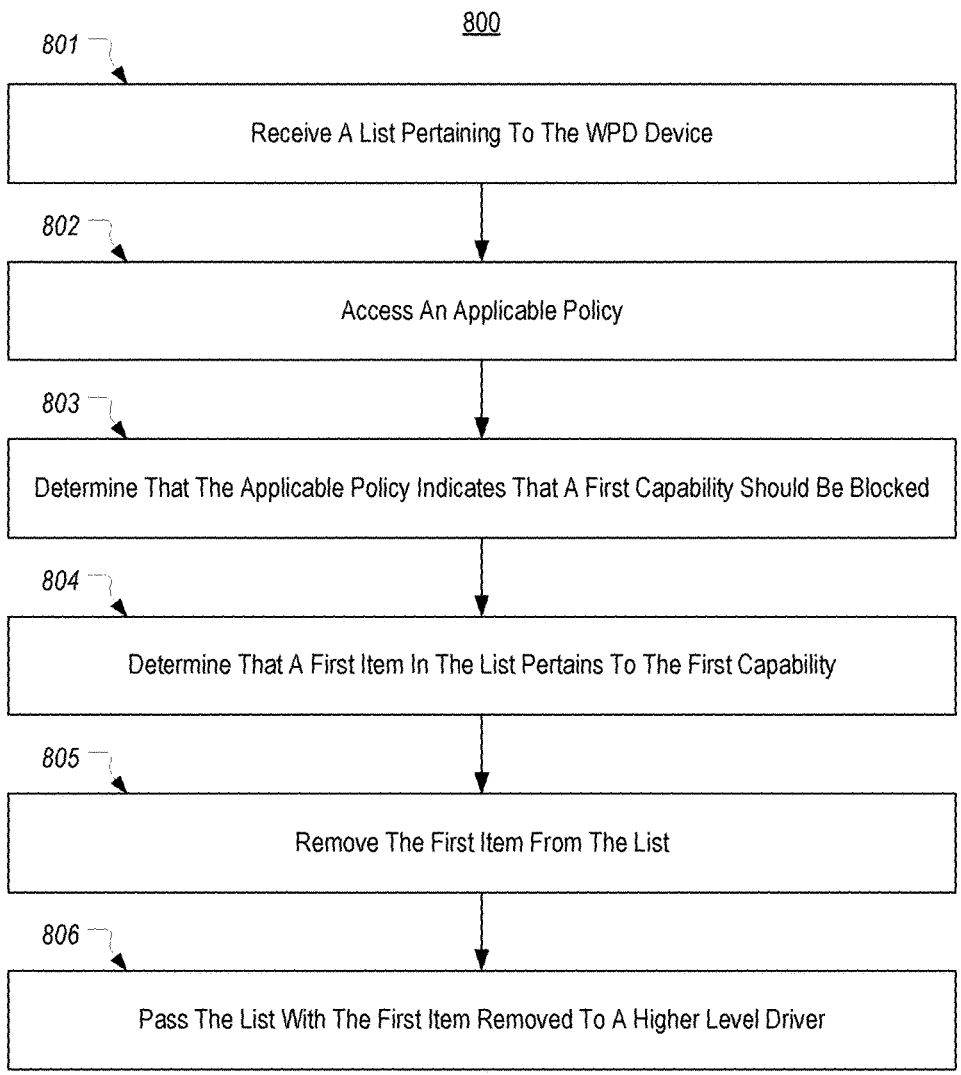
FIG. 8 illustrates a flowchart of an example method for enabling a WPD device to be managed at the capability level.

FIG. 8 provides a flow chart of an example method 800 for enabling a WPD device to be managed at the capability level. Method 800 can be implemented by a filter driver that is loaded onto the device stack for a WPD device such as filter driver 400.

Method 800 includes an act 801 of receiving a list pertaining to the WPD device. For example, filter driver 400 can receive a list of capabilities that is returned for the WPD_COMMAND_CAPABILITIES_GET_FUNCTIONAL_OBJECTS command, a list of supported commands returned for the WPD_COMMAND_CAPABILITIES_GET_SUPPORTED_COMMANDS command, a list of command options returned for the WPD_COMMAND_CAPABILITIES_GET_COMMAND_OPTIONS command, or a list of other items returned by another WPD_CATEGORY_CAPABILITIES command or other type of WPD command (e.g., WPD_CATEGORY_OBJECT_PROPERTIES_BULK).

Method 800 includes an act 802 of accessing an applicable policy. For example, filter driver 400 can access policy 560 which may be in the form of an Active Directory group policy object or any other type of administrator-defined policy.

Method 800 includes an act 803 of determining that the applicable policy indicates that a first capability should be blocked. For example, filter driver 400 may determine that policy 560 indicates that mass storage devices should be blocked.

Method 800 includes an act 804 of determining that a first item in the list pertains to the first capability. For example, filter driver 400 can determine that WPD_FUNCTIONAL_CATEGORY_STORAGE is included in the list.

Method 800 includes an act 805 of removing the first item from the list. For example, filter driver 400 can remove WPD_FUNCTIONAL_CATEGORY_STORAGE from the list.

Method 800 includes an act 806 of passing the list with the first item removed to a higher level driver. For example, filter driver 400 can pass the list with WPD_FUNCTIONAL_CATEGORY_STORAGE removed to WPD driver 111.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by a filter driver, for enabling a Windows Portable Devices (WPD) device to be managed at the capability level, the method comprising:
   receiving, at the filter driver that is loaded in a device stack for the WPD device, a WPD command that was initiated by an application, the WPD command querying capabilities of the WPD device, the filter driver receiving the WPD command as the WPD command is passed down the device stack for the WPD device;
   passing the WPD command down the device stack;

receiving, at the filter driver, a list that is generated in response to the WPD command, the filter driver receiving the list as the list is passed up the device stack for the WPD device;
accessing an applicable policy;
determining that the applicable policy indicates that a first capability of the WPD device should be blocked;
determining that a first item in the list pertains to the first capability of the WPD device;
modifying the list prior to passing the list up the device stack by removing the first item from the list; and
passing the modified list with the first item removed to a higher level driver to thereby prevent the application that initiated the WPD command from being notified of the first capability of the WPD device.

2. The method of claim 1, wherein the filter driver is a kernel-mode filter driver.

3. The method of claim 1, wherein the filter driver is loaded in the device stack above a WPD class driver.

4. The method of claim 3, wherein the WPD class driver is a Media Transfer Protocol (MTP) driver.

5. The method of claim 1, wherein passing the list to the higher level driver comprises passing the list to a WPD driver.

6. The method of claim 1, wherein the list contains one or more identifiers of functional objects of the WPD device such that the first item is an identifier of a first functional object.

7. The method of claim 1, wherein the list contains commands supported by a WPD class driver of the WPD device such that the first item is a first command pertaining to the first capability.

8. The method of claim 7, wherein the list contains multiple commands pertaining to the first capability, the method comprising:
removing each command pertaining to the first capability from the list.

9. The method of claim 1, wherein the list contains options for a command supported by a WPD class driver of the WPD device such that the first item is a first option of the command and the command pertains to the first capability.

10. The method of claim 9, wherein the list contains multiple options for the command, the method comprising: removing each option for the command.

11. The method of claim 1, wherein the list contains identifiers of capabilities of the WPD device, the method further comprising:
determining that the list is empty after removing the first item; and
in response, causing initialization of the WPD device to fail.

12. The method of claim 11, wherein causing initialization of the WPD device to fail comprises failing the IRP_MN_START_DEVICE IRP.

13. The method of claim 1, wherein the device stack includes a virtual bus driver that implements redirection of the WPD device.

14. One or more computer storage media storing computer executable instructions which when executed by one or more processors implement a method for managing a WPD device, the method comprising:
receiving, at the filter driver that is loaded in a device stack for a WPD device, a request to list capabilities of the WPD device that was initiated by an application, the filter driver receiving the request as the request is passed down the device stack for the WPD device;
passing the request down the device stack;
intercepting, at the filter driver, a response to the request to list capabilities of the WPD device as the response is passed up the device stack for the WPD device;
comparing each capability of the WPD device listed in the response to an applicable policy;
modifying the response prior to passing the response up the device stack by, for each listed capability of the WPD device that the applicable policy indicates should be blocked, removing the capability from the response; and
after removing at least one listed capability of the WPD device from the response, passing the modified response to a higher level driver to thereby prevent the application that initiated the request from being notified of any capability of the WPD device that the applicable policy indicates should be blocked.

15. The computer storage media of claim 14, wherein the method further comprises:
intercepting, at the filter driver, a response to a request to list commands supported by the WPD device;
for each command that is associated with a capability that the applicable policy indicates should be blocked, removing the command from the response; and
passing the response to the higher level driver.

16. The computer storage media of claim 14, wherein the method further comprises:
intercepting, at the filter driver, a response to a request to list options for a command supported by the WPD device;
determining that the command pertains to a capability that the applicable policy indicates should be blocked;
removing the options for the command from the list; and
passing the list with the options for the command removed to the higher level driver.

17. The computer storage media of claim 14, wherein the applicable policy indicates that a mass storage capability should be blocked.

18. The computer storage media of claim 14, wherein the method further comprises:
determining that the response no longer includes any capabilities; and
preventing the WPD device from starting.

19. The computer storage media of claim 18, wherein the filter driver is configured to be loaded in the device stack between a WPD class driver and a WPD driver.

20. A method for enabling a redirected Windows Portable Devices (WPD) device to be managed at the capability level, the method comprising:
in response to the WPD device being connected to a client terminal that has established a remote session on a server, causing a filter driver to be loaded on a device stack on the server for the WPD device;
intercepting, at the filter driver, a list of capabilities of the WPD device as the list is passed up the device stack for the WPD device;
modifying the list by removing one or more capabilities of the WPD device that an applicable policy indicates should be blocked; and
passing the modified list up the device stack to a WPD driver to thereby prevent an application that requested the list of capabilities from being notified of the one or more capabilities of the WPD device that the applicable policy indicates should be blocked.

* * * * *